(12) United States Patent
Kim

(10) Patent No.: US 11,654,819 B2
(45) Date of Patent: May 23, 2023

(54) LAMP FOR VEHICLE HAVING A LIGHT GUIDE COUPLED TO A ROTARY SHAFT

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/658,426

(22) Filed: Apr. 7, 2022

(65) Prior Publication Data

US 2022/0340073 A1 Oct. 27, 2022

(30) Foreign Application Priority Data

Apr. 22, 2021 (KR) ........................ 10-2021-0052400

(51) Int. Cl.
*B60Q 1/068* (2006.01)
*B60Q 1/076* (2006.01)
*F21S 41/24* (2018.01)
*F21S 41/63* (2018.01)
*F21S 41/32* (2018.01)

(52) U.S. Cl.
CPC ............ *B60Q 1/0683* (2013.01); *B60Q 1/076* (2013.01); *F21S 41/24* (2018.01); *F21S 41/321* (2018.01); *F21S 41/635* (2018.01)

(58) Field of Classification Search
CPC .......... F21S 41/24; F21S 10/005; F21S 10/00; B60Q 3/62
See application file for complete search history.

(56) References Cited

U.S. PATENT DOCUMENTS 10,072,955 B2 * 9/2018 Miyazawa ............... B60Q 3/62

* cited by examiner

*Primary Examiner* — Robert J May
(74) *Attorney, Agent, or Firm* — DLA Piper LLP (US)

(57) ABSTRACT

A lamp for a vehicle and a vehicle including the lamp. One aspect of the present disclosure provides a lamp for a vehicle, the lamp including a first light source configured to emit light, a light guide unit having one side facing the first light source and configured such that the light emitted from the first light source enters the light guide unit, a rotary shaft having one side fixedly coupled to the light guide unit, and a power supply unit configured to provide power for rotating the rotary shaft.

16 Claims, 3 Drawing Sheets

LAMP FOR VEHICLE HAVING A LIGHT GUIDE COUPLED TO A ROTARY SHAFT

CROSS-REFERENCE TO RELATED APPLICATION

This application claims priority to and the benefit of Korean Patent Application No. 10-2021-0052400 filed in the Korean Intellectual Property Office on Apr. 22, 2021, the entire contents of which are incorporated herein by reference.

TECHNICAL FIELD

The present disclosure relates to a lamp for a vehicle and a vehicle including the same, and more particularly, to a lamp for a vehicle, which is capable of implementing various lighting images, and a vehicle including the same.

BACKGROUND ART

There are increasing demands for aesthetic appearances required for lamps mounted in vehicles, and thus the lamps need to implement various lighting images. Therefore, studies are also being actively conducted on lamps for vehicles capable of implementing various lighting images while improving aesthetic appearances.

In the related art, a lamp for a vehicle, which is equipped with LEDs, uses an LED drive module (LDM) that controls and turns on or off the LEDs independently to implement various lighting images. However, because this method implements the lighting images by turning on or off the LEDs in a state in which main components of the lamp are fixed without being modified, which makes it difficult to implement dynamic lighting images.

SUMMARY

The present disclosure has been made in an effort to provide a lamp for a vehicle, which is capable of implementing dynamic lighting images while implementing various lighting images.

An exemplary embodiment of the present disclosure provides a lamp for a vehicle, the lamp including: a first light source configured to emit light; a light guide unit having one side facing the first light source and configured such that the light emitted from the first light source enters the light guide unit; a rotary shaft having one side fixedly coupled to the light guide unit; and a power supply unit configured to provide power for rotating the rotary shaft.

The light guide unit may include: a coupling region coupled to a front end of the rotary shaft; and a light distribution region having one end coupled to the coupling region and the other opposite end facing the first light source.

The light distribution region may be provided in plural, and the plurality of light distribution regions may be spaced apart from one another and disposed in an outer circumferential direction of the coupling region.

The first light source may be provided in plural, and the plurality of first light sources may each face the other end of each of the plurality of light distribution regions.

The light distribution region may have an inclined shape that extends outward in a width direction H in a direction from the coupling region to the first light source.

The light distribution region may include: a front section disposed adjacent to the coupling region; a rear section disposed adjacent to the first light source; and a central section disposed between the front section and the rear section, and a gradient of the central section may be larger than a gradient of the front section and a gradient of the rear section.

The lamp may further include an accommodation unit disposed rearward of the first light source and configured to accommodate the first light source.

A part of the accommodation unit may be inserted and coupled into the coupling region.

The lamp may further include: a support unit disposed rearward of the accommodation unit and configured to support the accommodation unit; and a ball bearing disposed between the accommodation unit and the support unit and provided to be slidable relative to the accommodation unit and the support unit.

The lamp may further include a reflector disposed rearward of the light guide unit and provided inside the first light source based on a width direction H.

The reflector may have a shape recessed rearward.

The lamp may further include an inner support member disposed rearward of the reflector and provided to be in close contact with the reflector, the inner support member may include a stepped region having a stepped shape, and the reflector may be seated on an edge of the stepped region.

The lamp may further include a fixing member having one end provided to be in close contact with the inner support member and the other opposite end configured to face the rotary shaft, the fixing member being configured to support the rotary shaft.

The fixing member may be disposed inside the reflector based on the width direction H.

The lamp may further include a second light source provided to be in close contact with the inner support member and disposed between the reflector and the fixing member.

The rotary shaft may penetrate the inner support member, and the power supply unit may be disposed rearward of the inner support member.

The first light source may receive electric power from the support unit by wireless power transfer.

Another exemplary embodiment of the present disclosure provides a vehicle including: a lamp for a vehicle, in which the lamp includes: a first light source configured to emit light; a light guide unit having one side facing the first light source and configured such that the light emitted from the first light source enters the light guide unit; a rotary shaft having one side coupled to the light guide unit and configured to rotate the light guide unit; and a power supply unit configured to provide power for rotating the rotary shaft.

According to the present disclosure, it is possible to manufacture the lamp for a vehicle, which is capable of implementing dynamic lighting images while implementing various lighting images.

DETAILED DESCRIPTION

Hereinafter, a lamp for a vehicle and a vehicle according to the present disclosure will be described with reference to the drawings.

LAMP FOR VEHICLE

Figure 1:
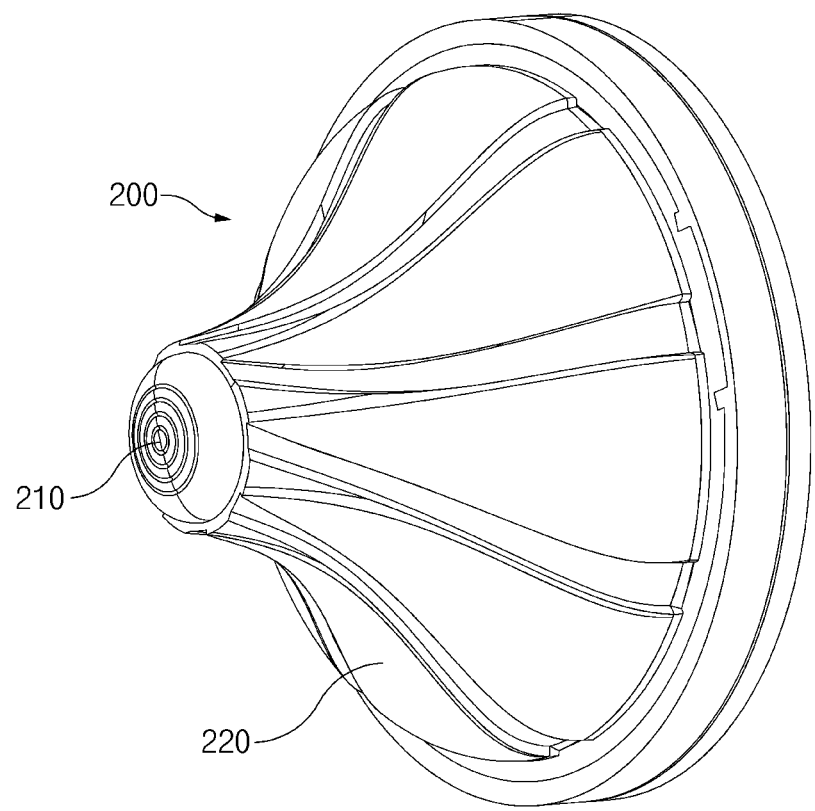
FIG. 1 is a perspective view illustrating a structure of a lamp for a vehicle according to the present disclosure.
Figure 2:
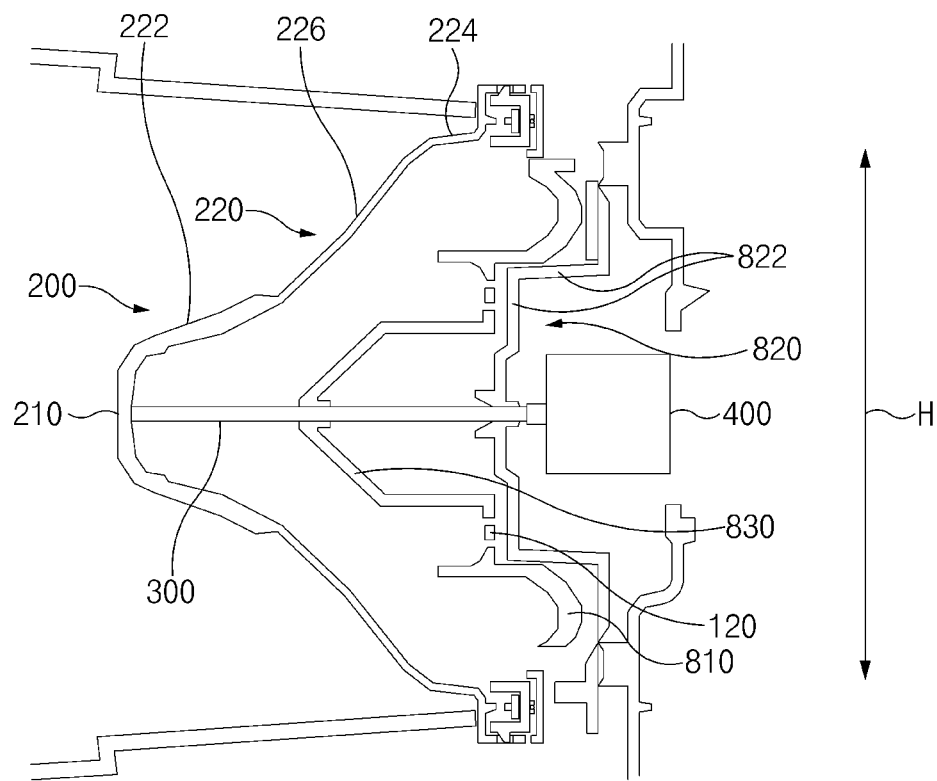
FIG. 2 is a cross-sectional view illustrating the structure of the lamp for a vehicle according to the present disclosure.

FIG. 1 is a perspective view illustrating a structure of a lamp for a vehicle according to the present disclosure, and FIG. 2 is a cross-sectional view illustrating the structure of the lamp for a vehicle according to the present disclosure. In addition, FIG. 3 is an enlarged view of a first light source and components around the first light source of the lamp for a vehicle according to the present disclosure.

Figure 3:
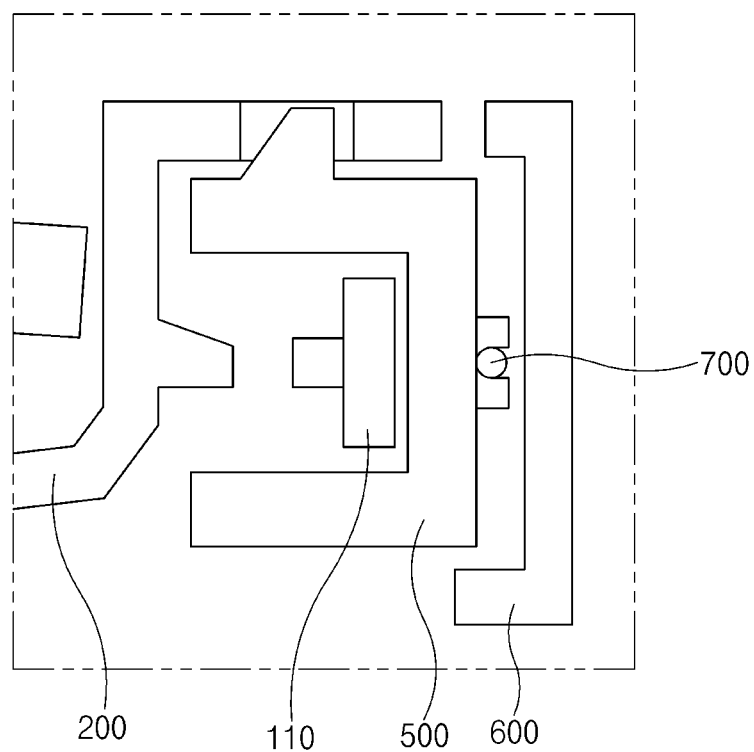
FIG. 3 is an enlarged view of a first light source and components around the first light source of the lamp for a vehicle according to the present disclosure.

As illustrated in FIGS. 1 to 3, a lamp 10 for a vehicle (hereinafter, referred to as the 'lamp') according to the present disclosure may include a first light source 110 configured to emit light, and a light guide unit 200 having one side facing the first light source 110 and configured such that light emitted from the first light source 110 enters the inside of the light guide unit 200. More particularly, one end of the light guide unit 200 may face the first light source 110. Therefore, light emitted from the first light source 110 enters the inside of the light guide unit 200 and propagates in the internal space of the light guide unit 200 while being totally reflected. In FIG. 2, a direction in which light emitted from the first light source propagates in the internal space of the light guide unit 200 is indicated by the arrow.

In addition, the lamp 10 may further include a rotary shaft 300 having one side fixedly coupled to the light guide unit 200, and a power supply unit 400 configured to provide power for rotating the rotary shaft 300. The rotary shaft 300 may rotate by receiving power from the power supply unit 400. When the rotary shaft 300 rotates, the light guide unit 200 fixedly coupled to the rotary shaft 300 also rotates. Therefore, according to the present disclosure, it is possible to easily implement a lighting image, which seems to move when the lamp 10 is viewed from the outside, by rotating the light guide unit 200 in a state in which the first light source 110 is turned on. For example, the power supply unit 400 may be an electric motor. Hereinafter, a structure of the light guide unit 200 will be described in detail with reference to the drawings.

As illustrated in FIGS. 1 and 2, the light guide unit 200 may include a coupling region 210 coupled to a front end of the rotary shaft 300, and a light distribution region 220 having one end coupled to the coupling region 210, and the other opposite end disposed to face the first light source 110.

In addition, the light distribution region 220 may be provided in plural, and the plurality of light distribution regions 220 may be spaced apart from one another and disposed in an outer circumferential direction of the coupling region 210. For example, as illustrated in FIG. 1, the coupling region 210 may have an approximately circular shape, and the light distribution regions 220 may each have an approximately fan shape. However, the shapes of the coupling region 210 and the light distribution region 220 are not limited to the shapes illustrated in the drawings.

According to the present disclosure, light, which is emitted from the first light source 110 and enters internal spaces of the light distribution regions 220, propagates in the internal spaces of the light distribution regions 220 while being totally reflected. A part of the light passes through the light distribution regions 220 and is emitted to the outside. The light emitted to the outside propagates to a location in front of the vehicle and forms a predetermined beam pattern. In addition, a part of the light propagating in the internal spaces of the light distribution regions 220 may reach the coupling region 210 and then be emitted to the outside.

In addition, the first light source 110 may also be provided in plural, like the plurality of light distribution regions 220. In this case, the plurality of first light sources 110 may each face the other end of each of the plurality of light distribution regions 220. More particularly, the plurality of light distribution regions 220 and the plurality of first light sources 110 may correspond to one another in a one-to-one manner.

Meanwhile, as illustrated in FIG. 2, the light distribution region 220 may have an inclined shape. More particularly, the light distribution region 220 may have an inclined shape that extends outward in a width direction H of the lamp 10 in a direction from the coupling region 210 to the first light source 110.

For example, as illustrated in FIG. 2, the light distribution region 220 may include a front section 222 disposed adjacent to the coupling region 210, a rear section 224 disposed adjacent to the first light source 110, and a central section 226 disposed between the front section 222 and the rear section 224. In this case, a gradient of the central section 226 may be larger than a gradient of the front section 222 and a gradient of the rear section 224. However, the shape of the light distribution region 220 is not limited to the shape described above and illustrated in the drawings.

Referring to FIG. 3, the lamp 10 according to the present disclosure may further include an accommodation unit 500 disposed rearward of the first light source 110 and configured to accommodate the first light source 110. The accommodation unit 500 may serve to protect the first light source 110 from the outside while fixing the first light source 110 relative to the light guide unit 200. To this end, as illustrated in FIG. 2, a cross-section of the accommodation unit 500 may have a U shape. A part of the accommodation unit 500 may be inserted and coupled into an outer region of the coupling region 210 based on the width direction H. More particularly, the accommodation unit 500 may be in close contact with the first light source 110.

Meanwhile, referring to FIG. 3, the lamp 10 may further include: a support unit 600 disposed rearward of the accommodation unit 500 and configured to support the accommodation unit 500; and a ball bearing 700 disposed between the accommodation unit 500 and the support unit 600 and provided to be slidable relative to the accommodation unit 500 and the support unit 600.

According to the present disclosure, when the light guide unit 200 rotates, the first light source 110 facing the light guide unit 200 also needs to rotate. Therefore, the accommodation unit 500, which accommodates the first light source 110, also needs to rotate. In contrast, the support unit 600 may be fixed regardless of the rotation of the light guide unit 200. Therefore, the ball bearing 700 disposed between the accommodation unit 500 and the support unit 600 may serve to enable the accommodation unit 500 and the support unit 600 to move relative to each other.

Meanwhile, as illustrated in FIG. 2, the lamp 10 according to the present disclosure may further include a reflector 810 disposed rearward of the light guide unit 200 and provided inside the first light source 110 based on the width direction H. The reflector 810 may serve to reflect a part of the light, which propagates in the internal space of the light guide unit 200 and then is emitted rearward, and then emit the light forward. For example, as illustrated in FIG. 2, the reflector 810 may have a shape recessed rearward.

In addition, the lamp 10 according to the present disclosure may further include an inner support member 820 disposed rearward of the reflector 810 and provided to be in close contact with the reflector 810. The inner support member 820 may serve to support not only the reflector 810 but also a fixing member and a second light source which will be described below.

More particularly, the inner support member 820 may include a stepped region 822 having a stepped shape. The reflector 810 may be seated on an edge of the stepped region 822.

In addition, the lamp 10 according to the present disclosure may further include a fixing member 830 having one end provided to be in close contact with the inner support member 820, and the other opposite end configured to face the rotary shaft 300, the fixing member being configured to support the rotary shaft. In this case, the fixing member 830 may be disposed inside the reflector 810 based on the width direction H. The fixing member 830 may serve to reduce vibration of the rotary shaft 300 while preventing the separation of the rotary shaft 300 during the process of rotating the rotary shaft 300.

Referring to FIG. 2, the lamp 10 according to the present disclosure may further include a second light source 120 provided to be in close contact with the inner support member 820 and disposed between the reflector 810 and the fixing member 830. The second light source 120 may serve to implement a lighting image formed separately from the lighting image implemented by the first light source 110. That is, unlike the light emitted from the first light source 110, the light emitted from the second light source 120 may pass through the light guide unit 200 and propagate forward directly.

Meanwhile, as illustrated in FIG. 2, the rotary shaft 300 may penetrate the inner support member 820, and the power supply unit 400 may be disposed rearward of the inner support member 820. Therefore, the rotary shaft 300 may penetrate the inner support member 820 and be connected to the power supply unit 400.

Meanwhile, the first light source 110 may receive electric power by wireless power transfer. That is, according to the present disclosure, a separate electric wiring structure for providing electric power to the first light source may not be provided. The first light source 110 moves in conjunction with the rotation of the light guide unit 200 as described above. Therefore, in the case in which the electric wiring structure is connected to the first light source 110, there may occur a problem in that the electric wiring structure tangles when the first light source 110 moves. However, according to the present disclosure, the above-mentioned problem may be prevented since the first light source 110 receives electric power by wireless power transfer. For example, the first light source 110 may receive electric power from the support unit 600 by magnetic induction or magnetic resonance.

VEHICLE

A vehicle according to the present disclosure may include the lamp 10 for a vehicle. In this case, the lamp 10 may include: the first light source 110 configured to emit light; the light guide unit 200 having one side facing the first light source 110 and configured such that the light emitted from the first light source 110 enters the inside of the light guide unit 200; the rotary shaft 300 having one side coupled to the light guide unit 200 and configured to rotate the light guide unit 200; and the power supply unit 400 configured to provide power for rotating the rotary shaft 300.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:
a first light source configured to emit light;
a light guide unit having one side facing the first light source and configured such that the light emitted from the first light source enters the light guide unit, wherein the light guide unit comprises:
a rotary shaft having a front end coupled to the light guide unit at a coupling region of the light guide unit;
a light distribution region having one end coupled to the coupling region and another opposite end facing the first light source; and
a plurality of light distribution regions spaced apart from one another and disposed in an outer circumferential direction of the coupling region; and
a power supply unit configured to provide power for rotating the rotary shaft.

2. The lamp of claim 1, further comprising a plurality of first light sources and the plurality of first light sources each faces the another end of each of the plurality of light distribution regions.

3. The lamp of claim 1, wherein the light distribution region has an inclined shape that extends outward in a width direction in a direction from the coupling region to the first light source.

4. The lamp of claim 3, wherein the light distribution region comprises:
a front section disposed adjacent to the coupling region;
a rear section disposed adjacent to the first light source; and
a central section disposed between the front section and the rear section,
wherein a gradient of the central section is larger than a gradient of the front section and a gradient of the rear section.

5. The lamp of claim 1, further comprising:
an accommodation unit disposed rearward of the first light source and configured to accommodate the first light source.

6. The lamp of claim 5, wherein a part of the accommodation unit is inserted and coupled into the coupling region.

7. The lamp of claim 5, further comprising:
a support unit disposed rearward of the accommodation unit and configured to support the accommodation unit; and
a ball bearing disposed between the accommodation unit and the support unit and provided to be slidable relative to the accommodation unit and the support unit.

8. The lamp of claim 7, wherein the first light source receives electric power from the support unit by wireless power transfer.

9. The lamp of claim 1, further comprising:
a reflector disposed rearward of the light guide unit and provided inside the first light source based on a width direction.

10. The lamp of claim 9, wherein the reflector has a shape recessed rearward.

11. The lamp of claim 9, further comprising:
an inner support member disposed rearward of the reflector and provided to be in contact with the reflector,
wherein the inner support member comprises a stepped region having a stepped shape and the reflector is seated on an edge of the stepped region.

12. The lamp of claim 11, further comprising:
a fixing member having one end provided to be in contact with the inner support member and another opposite end configured to face the rotary shaft, the fixing member being configured to support the rotary shaft.

13. The lamp of claim 12, wherein the fixing member is disposed inside the reflector based on the width direction.

14. The lamp of claim 13, further comprising:
a second light source provided to be in contact with the inner support member and disposed between the reflector and the fixing member.

15. The lamp of claim 11, wherein the rotary shaft penetrates the inner support member and the power supply unit is disposed rearward of the inner support member.

16. A vehicle comprising:
a lamp for a vehicle,
wherein the lamp comprises:
a first light source configured to emit light;
a light guide unit having one side facing the first light source and configured such that the light emitted from the first light source enters the light guide unit, wherein the light guide unit comprises:
  a rotary shaft configured to rotate the light guide unit having a front end coupled to the light guide unit at a coupling region of the light guide unit;
  a light distribution region having one end coupled to the coupling region and another opposite end facing the first light source; and
  a plurality of light distribution regions spaced apart from one another and disposed in an outer circumferential direction of the coupling region;
a power supply unit configured to provide power for rotating the rotary shaft.

\* \* \* \* \*